United States Patent [19]
Ono et al.

[11] Patent Number: 5,246,897
[45] Date of Patent: Sep. 21, 1993

[54] POWDER MIXTURE FOR MONOLITHIC REFRACTORIES CONTAINING GRAPHITE AND A METHOD OF MAKING THEREOF

[75] Inventors: Yasushi Ono; Satoshi Sakamoto, both of Takasago, Japan

[73] Assignee: Asahi Glass Company Ltd., Tokyo, Japan

[21] Appl. No.: 922,497

[22] Filed: Jul. 31, 1992

[30] Foreign Application Priority Data

Aug. 9, 1991 [JP] Japan .................................. 3-223681
Aug. 28, 1991 [JP] Japan .................................. 3-242559

[51] Int. Cl.$^5$ ............................................ C04B 35/54
[52] U.S. Cl. ..................................... 501/101; 501/100
[58] Field of Search ........................... 501/87, 100, 101

[56] References Cited

U.S. PATENT DOCUMENTS 4,471,059 9/1984 Yoshino et al. ..................... 501/96
4,912,068 3/1990 Michael et al. .................... 501/101

FOREIGN PATENT DOCUMENTS 1-46473 10/1989 Japan .
2-33666 7/1990 Japan .
2-311338 12/1990 Japan .
3-2009 1/1991 Japan .

Primary Examiner—Mark L. Bell
Assistant Examiner—Chris Gallo
Attorney, Agent, or Firm—Oblon, Spivak, McClelland, Maier & Neustadt

[57] ABSTRACT

Hydrophilic graphite-base powder is provided wherein hydrophilic small particles of such as silicon carbide or silica are mixed with a graphite powder and the small particles are attached to each surface of the graphite particles by performing a mechanical impact treatment in a high-speed gas flow. By combining the graphite-base powders with refractory compound powders of such as magnesia or alumina to be a powder mixture for monolithic refractories containing graphite, a formed body of the powder mixture having a large bulk density can be provided and a service life thereof is comparable to that of a shaped refractory, and labor and energy necessary for the production process and the operation are saved.

6 Claims, 1 Drawing Sheet

POWDER MIXTURE FOR MONOLITHIC REFRACTORIES CONTAINING GRAPHITE AND A METHOD OF MAKING THEREOF

BACKGROUND OF THE INVENTION

1. Field of the Invention

This invention relates to a powder mixture for monolithic refractories containing graphite and a method of making thereof utilized in a lining of a vessel which is used in the processes of iron making and steel making, and its repair.

2. Discussion of the Invention

Shaped refractories containing graphite are widely used in the field of iron making and steel making since they have preferable properties such as refractoriness and thermal shock resistance, and are hardly wettable to molten iron, molten steel and molten slag, showing an excellent corrosion resistance. However, the conventional shaped refractories containing graphite which are preformed and baked or fired have an excellent performance, many steps of operation and much energy are required in the production and the operation thereof. Accordingly, much cost and operational time are required as a whole. On the other hand, labor-saving is a necessary condition in the business of refractories, for maintaining an enterprising activity. Therefore, the use of monolithic refractories is increasing as a general tendency.

The monolithic refractories are operated by adding a dispersion media such as water to a premixed powder mixture in the operational field. They are operated by methods of gunning, casting with vibration, stamping and the like. As the dispersion media, it is possible to utilize an organic solvent having a good wettability with respect to graphite particles. However, in view of the working environment and the cost thereof, it is the best method to utilize water as the dispersion media.

When water is used as the dispersion media for monolithic refractories containing graphite, since the graphite particles are devoid of a hydrophilic property (the same with the dispersive property with respect to water), a molded body having a large bulk density can not be obtained as in the case of other many monolithic refractories. Accordingly, the obtained monolithic refractories containing graphite are considerably inferior to shaped refractories in properties such as oxidation resistance, corrosion resistance or strength, and refractories having a long service life cannot be obtained, which is a hazard against the practical utilization thereof.

Only little functional groups having a hydrophilic property such as —OH, —COOH or the like are existent on surfaces of the graphite particles. The surface has a hexagonal mesh structure of carbon atoms having no hydrophilic property. The absolute value of $\zeta$-potential on the interface thereof with water is small when water is utilized as the dispersion media. Therefore, the graphite particles have a poor hydrophilic property. As methods to avoid the problems of the graphite particles having a poor hydrophilic property, that is, inferior dispersive property with respect to water, strong acid treatment method, CVD (chemical vapor deposition) method, sol-gel method, polymer coating method and the like have been investigated. However, no satisfactory result has been obtained by any one of these methods.

In the strong acid treatment method, a graphite powder is immersed in concentrated sulfuric acid, concentrated nitric acid, hydrofluoric acid or the like, and reacted with these acids at room temperature to 100° C., thereby making the surfaces of the graphite particles hydrophilic. However, the acid components penetrate in the graphite crystal and intercalation compounds are formed, whereby the graphite particles are expanded and the acid components remaining in the graphite crystals dissolve into water added as the dispersion media, thereby changing the pH value and deteriorating the dispersed state or making it unstable. Accordingly, when the graphite-base powder (hereinafter a surface improved graphite powder is called a graphite-base powder) is utilized as a raw material powder of monolithic refractories, a formed body having a large bulk density can not be obtained.

In the CVD method, a gas component such as SiO or $B_2O_3$ is brought in contact with the surfaces of the graphite particles for instance, at 1000° C. or more, thereby forming thin films of SiC or $B_4C$ on their surfaces. By this reaction, the surfaces of the graphite particles are oxidized and become a porous rugged structure thereby lowering the oxidation resistance of the graphite particles. As a substitute method, halide CVD method is well known. However, since the raw material gas thereof is expensive and an emission gas treatment is necessary, the method is not suitable for treating raw material powders of refractories having a low added value.

In the sol-gel method, for instance, silicon alkoxide, aluminum alkoxide or the like is hydrolyzed in an alcoholic aqueous solution in the presence of an acidic catalyst. The obtained sol solution is impregnated in a graphite powder, which is dried to be a gel, thereby attaching $SiO_2$ or $Al_2O_3$ gel film to the surfaces of the graphite particles. However, since the wettability of the graphite particles with respect to the sol solution is poor, vacancies are formed between the graphite particles and gel films, and much surface portions which are not covered by the gel films, remain. Accordingly, a sufficient dispersive property of the graphite base powder with respect to water is not obtained and therefore, a molded body having a large bulk density can not be obtained when they are formed using water as the dispersion media.

In the polymer coating method, disclosed for instance in Japanese Examined Patent Publication No. 33666/1990, solution of phenol resin, furanol resin, silicone resin or the like is impregnated in a graphite powder thereby forming coatings of organic resin on the particle surfaces of the graphite powder. As in the case of solgel method, the resin coated graphite-base powder is devoid of the water wettability and become porous since the resin is thermally decomposed in their use. Accordingly, a formed body of a monolithic refractory containing graphite having a good service life can not be obtained.

As a conventional trial for obtaining a graphite powder having hydrophilic property used for the monolithic refractories containing graphite, there is a description for instance, in Japanese Examined Patent Publication No. 46473/1989. By making a pelleted graphite-base powder wherein a thermosetting resin or a thermoplastic resin is mixed with a graphite powder and the mixture is pressed, or the pressed body is broken, the dispersion property with respect to water is improved.

The hydrophilic property of the graphite particles can be improved to some degree in any one of the above methods. However, most of the organic resins coated on the graphite particles or taken in the graphite particles, are thermally decomposed in their use and discharged as gases, thereby increasing the porosity of refractories and deteriorating the oxidation resistance and the corrosion resistance which are important properties in these kinds of refractories.

Furthermore, in the above proposals, there is a description wherein particle surfaces of aluminum or silicon are covered simultaneously with surfaces of graphite particles by an organic resin. In this case, the hydrophilic property of the organic resin which is not necessarily good regulates the hydrophilic property of these powders.

As a recent technology, a surface improving method of solid particles is proposed in Japanese Examined Patent Publication No. 2009/1991. As a preferable method of attaching particles having a particle size in a range of 0.01 to 10 $\mu$m to surfaces of other particles having a particle size in a range of 0.1 to 100 $\mu$m, a method is proposed wherein a mechanical impact force is utilized. As a substantial means, a method of mechanical impact treatment in a high-speed gas flow, is disclosed. However with respect to particles of a graphite powder having a particular cleavage, no suggestion is presented in the specification to whether the surface improvement of the natural flake graphite particles is possible by this method.

SUMMARY OF THE INVENTION

It is an object of the present invention to provide a powder mixture for monolithic refractories containing graphite wherein a constituent graphite base powder is excellent in a hydrophilic property, devoid of shortcomings as in the conventional surface-treated graphite-base powders, whereby a formed body excellent in corrosion resistance and oxidation resistance, having a high bulk density, is obtained by utilizing the graphite-base powder in monolithic refractories.

The powder mixture for monolithic refractories containing graphite of this invention is a powder mixture mainly composed of a graphite-base powder and refractory compound powders, wherein small particles having a hydrophilic property and a mean particle size smaller than that of the graphite particles, are tightly attached to surfaces of each graphite particles of the graphite powder, and wherein the graphite-base powder is contained in the powder mixture by 2 to 40 wt % in terms of a carbon amount.

In this invention, the mean particle size of a powder is the particle size at the half volume of the accumulated total particulate volume, which is measured by a particle size distribution analyzer by laser diffraction. Furthermore, tightly attaching small particles on surfaces of graphite particles, designates a state wherein the small particles are strongly attached or adhered to the graphite particles without using any adhesive agent which helps the adhesion, and a state wherein the small particles are hardly separated therefrom even if they are mixed with refractory compound powders or mixed with a dispersion media in the operation. The weight percent is based on the weight of the powder mixture excluding the weights of the dispersion media and any organic additive which are decomposed in its use. When the carbon amount in the powder mixture for monolithic refractories containing graphite is smaller than 2 wt %, good properties thereof wherein a molded body of operated refractory is hardly wettable to a slag or molten iron and a thermal shock resistance thereof is good, are not obtained. When the carbon amount is larger than 40 wt %, porosity of the formed body of the monolithic refractories is large and the oxidation resistance and the corrosion resistance are poor.

The refractory compound powders utilized in the powder mixture for monolithic refractories containing graphite of this invention, are of at least one selected from the group of a metal oxide, a metal carbide, a metal nitride and a metal boride. As preferable examples of the metallic oxide, there are magnesia, chromia, dolomite, spinel, alumina, zirconia, zircon, silica rock, pyrophyllite, chamotte and aluminous shale. As the metallic carbide, silicon carbide, as the metallic nitride, silicon nitride, as the metallic boride, zirconium boride and titanium boride can preferably used. One having good fire-resistance and good corrosion resistance under each conditions of use, is selected and preferably utilized as one of the refractory compound powders of the powder mixture of this invention. Furthermore, as the refractory compound powders, normally those having coarse and dense particles (aggregate) are utilized to obtain the corrosion resistance by enhancing the bulk density of a formed body of monolithic refractories.

In a preferable embodiment of the powder mixture for monolithic refractories containing graphite of this invention, the graphite-base powder is contained in the powder mixture by 4 to 25 wt % in terms of a carbon amount. By specifying the graphite content in the mixture in a range of 4 to 22 wt %, a monolithic refractory with balanced good properties of thermal shock resistance, oxidation resistance, corrosion resistance and excellent service life is obtained.

In another embodiment of the powder mixture for monolithic refractories containing graphite of this invention, the mean particle size of the small particles having the hydrophilic property is not larger than 40% of the mean particle size of the graphite particles. By specifying the mean particle size of the small particles as not larger than 40% of the mean particle size of the graphite particles, more preferably not larger than 20%, the surface energy of the small particles is enhanced, then the adhesion force of the small particles to the surfaces of the graphite particles is increased, and the surfaces of the graphite particles can completely be covered by a comparatively small amount of the small particles.

As specific examples of the small particles having the hydrophilic property, there are such metal oxides as silica, mullite, alumina, magnesia, spinel, chromia, zirconia, titania, boron oxide, zircon, aluminous cement and clay, such metal carbides as boron carbide and silicon carbide, such metal nitrides as silicon nitride and boron nitride, such metal borides as zirconium boride and titanium boride, and such metals as aluminum, silicon, titanium and alloys of these, which are selected in accordance with the usage of monolithic refractories.

The reason that the surfaces of the particles of these compounds have the hydrophilic property, is because the surfaces of the particles are in oxidized states and provided with polarities even in the case of non-oxide particles, and wettable with respect to water.

In another preferable embodiment of the powder mixture for monolithic refractories containing graphite of this invention, the small particles having the hydrophilic property are of at least one selected from the group of alumina, silica, silicon carbide, silicon and aluminum. Alumina, silica and silicon carbide are easily available and provided with the fire-resistance property. Small particles of silicon, aluminum and silicon carbide show preferable functions wherein they not only provide the hydrophilic property to the graphite particles but also prevent the oxidation of graphite particles in use.

Appropriate combinations of the small particles should be selected wherein, when monolithic refractories are utilized for instance as gunning, casting or stumping materials, the absolute values thereof of $\zeta$-potential with respect to water (including conditions of pH and the like) are large, and result good dispersion properties, thereby enabling to reduce the quantities of water addition, furthermore, in accordance with usages of refractories, the small particles can provide with such accompanying properties as thermal resistance, thermal shock resistance, thermal conductance, electrical conductivity and oxidation resistance of the graphite particles.

As a material of small particles having the hydrophilic property, silicon carbide is the most preferable one since the graphite particles are provided with a few preferable properties other than the hydrophilic property.

Since fine powders of alumina and silica having the hydrophilic property are easily available and provided with refractoriness, they are preferably utilized for the powder mixture for monolithic refractories containing graphite of this invention.

Silicon, aluminum and silicon carbide powders are utilized as small particles providing the hydrophilic property, and can prevent the oxidation of graphite particles. Silicon and silicon carbide powders, both providing the hydrophilic property, are oxidized in use, and thereby able to lower the gas permeability of formed monolithic refractories.

Silica and silicate powders, both providing the hydrophilic property, will form molten glass phases at elevated service temperatures which can cover the surfaces of the formed monolithic refractories.

As another preferable embodiment of the powder mixture for monolithic refractories containing graphite of this invention, the refractory compound powders are of magnesia or alumina. The refractory compound powders which are widely utilized in the iron and steel making processes as the refractory compound powders for the conventional shaped refractories containing graphite, are magnesia and alumina because they have excellent refractoriness and corrosion resistance with respect to molten steel, molten iron and molten slag. Magnesia and alumina powders, particularly electrically-fused powders of these are very preferable, since when they are utilized as the refractory compound powders of the powder mixture for monolithic refractories containing graphite of this invention, the formed refractories therefrom have excellent service lives for the use of iron and steel making.

As the graphite powders, natural flake graphite, natural earthy graphite and artificial graphite such as scrap of electrode, heat-treated pitch cokes and carbon black at an elevated temperature, and a mixture of these can be utilized in the powder mixture for monolithic refractories containing graphite of this invention. Among these, particularly the natural flake graphite is the most preferable graphite powders excellent in the oxidation resistance and the corrosion resistance in its use.

The graphite powder having a mean particle size of 0.1 $\mu$m to more than 1 mm can be utilized. However, the mean particle size is preferably in a range of 1 $\mu$m to 1 mm.

When the mean particle size of the graphite powder is not smaller than 1 $\mu$m, the preferable properties such as the corrosion resistance and the oxidation resistance inherent to the graphite are shown. When the mean particle size is not larger than 1 mm, the attachment of the small particles having the hydrophilic property to the particle surfaces of the graphite powder by the mechanical impact treatment is facilitated, thereby facilitating to form stable coatings of the graphite particles by the small particles having the hydrophilic property.

In the method of making a powder mixture for monolithic refractories containing graphite of this invention, a mixture of 70 to 97 wt % of graphite powder and 3 to 30 wt % of powders composed of small particles of at least one selected from the group of metal oxide, metal carbide, metal nitride, metal boride and metals having a hydrophilic property of which mean particle size is not larger than 40% of that of graphite particles of the graphite powder, is processed by a mechanical impact treatment in a high-speed gas flow, thereby forming graphite-base powder attached with the small particles having the hydrophilic property on each particle surface of the graphite powder, and the graphite-base powder is mixed with refractory compound powders, wherein a mixed ratio of the graphite-base powder is 2 to 40 wt % in terms of a carbon amount thereof.

Although a preferable mixing ratio of the hydrophilic small particles attached to each particle surfaces of the graphite powder depends on the ratio of the mean particle size of the small particles by the mean particle size of the graphite powder, it should preferably be a necessary and sufficient quantity for covering almost completely the particle surfaces of the graphite powder. For instance, to obtain the hydrophilic property providing the dispersion property to the particles of the graphite powder with respect to water, when ultra-fine powders having the mean particle size of micron order or less are mixed as the small particles, an effective hydrophilic property can be provided to the particles of the graphite powder by utilizing a small amount of the small particle powders of 3 wt % or more.

However, since the small particles are not a component of monolithic refractories having the corrosion resistance which is a major property in many use, the mixing ratio in the graphite-base powder should be normally not larger than 30 wt % and preferably not larger than 20 wt %.

When the mean particle size of the small particles is larger than the mean particle size of the graphite powder, or equivalent thereto, the number of the hydrophilic small particles attached to each particle of the graphite powder becomes small and an attaching strength of the small particles is lowered. When the powder mixture is operated as monolithic refractories, the porosity thereof will be large and show a poor performance as formed refractories.

To make the graphite powders hydrophilic, a mixture of the powders of the small particles having the hydrophilic property the mean particle size of which is smaller than that of the graphite powder and the graphite powder are charged into a conventionally known dry mechanical milling device. It can effectively and simply be achieved by performing a mechanical impact treatment wherein the particles of powder mixture are applied with mechanical shock and the both particles are collided each other in a high-speed gas flow utilizing particularly a mechanical impact treatment device as described in Japanese Examined Patent Publication No. 2009/1991. Furthermore, when the powder mixture wherein the hydrophilic small particles are weakly attached to the particle surfaces of the graphite powder previously, is charged into the mechanical impact treatment device, the tight attaching of the small particles to the particle surfaces of the graphite powder can more efficiently be performed.

When the small particles are not attached to the particle surfaces of the graphite powder by static electrical forces, there is a method wherein water (may be added with a small amount of surface active agent or a binder) is sprayed to wet, the particle surfaces of the graphite powder, and thereafter the particles are mixed.

In almost every combination, since the hardness of the graphite particles is smaller than those of the hydrophilic small particles, the impacted small particles are partly embedded into the particle surfaces of the graphite powder. The attaching of the small particles on the surfaces of the graphite particles is tight, thereby easily adding the hydrophilic property of the small particles to the graphite particles having the poor hydrophilic property.

Explanation will be given to specific examples of treatments utilizing a mechanical impact treatment device as follows.

First, predetermined portions of a graphite powder and the hydrophilic small particles are charged into a mixer provided with stirring blades for mixing. The small particles are preferably attached to surfaces of the graphite particles by static electrical force or the like, thereby forming a mixture of uniformly-dispersed powders. Next, the mixture is charged into a device performing the mechanical impact treatment in a high-speed gas flow and the particles of the mixture are repeatedly applied with mechanical actions such as an impact force, a compressive force, a frictional force, and a shear force. In the mean time, the small particles are tightly attached to the surfaces of the graphite particles while controlling a strength of the impact so that the graphite particles are not broken.

By this impact treatment, the graphite particles are removed of their edges to be particles of approximately having a spherical or ellipsoidal shape. The hydrophilic small particles are tightly attached to the surface of the graphite particles wherein they are partly embedded thereto, whereby the graphite particles are fairly covered with the small particles. The shapes of the graphite particles should preferably not be flake-like or needle-like wherein aspect ratios thereof (a ratio of major dimension/minor dimension) are large and should preferably be cubic or spherical wherein the aspect ratios are small since the graphite particles are hardly broken and the attachment of the small particles is easy.

Accordingly, it is a preferable method to reduce the aspect ratio of graphite particles by performing previously the mechanical impact treatment on the graphite particles or to select a graphite powder of particles with small values of the aspect ratio. In the method of performing the mechanical impact treatment in a high-speed gas flow, an action of reducing the aspect ratio of the particles of the graphite powders is simultaneously promoted. Furthermore, even if there are cracks or unevenness on the surface of the graphite particles, the small particles are tightly attached to the surfaces by embedding into the cracked or uneven portions thereby enhancing the density of the particles and providing a formed body of monolithic refractories having a large bulk density.

The graphite-base powder processed by the mechanical impact treatment as above, is provided with a good packing efficiency and the porosity of formed monolithic refractories can be reduced even when the powders are operated using an organic solvent as the dispersion media, thereby providing a formed body of a monolithic refractories having a large bulk density.

In the graphite-base powder, the particles are attached with hydrophilic small particles on the surfaces of the graphite particles, when the powder is mixed with water as a dispersion media, the absolute value of $\zeta$-potential at the particle interface is large, the dispersion property with respect to water is good, and the powder is capable of providing a castable batch having a good flow or a batch having a good packing efficiency by mixing them with refractory compound powders with a reduced amount of water. When the batch is operated, a formed body of a monolithic refractory having a large bulk density, an excellent oxidation resistance and a corrosion resistance is obtained. When the powder mixture for monolithic refractories containing graphite blended with the graphite-base powder having the good dispersion property with respect to water, is operated the bulk density of the formed body becomes larger than that of the conventional powder mixture for monolithic refractories containing graphite, and is approximately equal to that of a shaped refractory containing graphite. Furthermore, even when the bulk density is a little smaller than that of the shaped refractory containing graphite, the formed body of monolithic refractories has such an advantage compared with the shaped refractory, that it does not have joints which are easy to be corroded. As a whole, in view of such properties as oxidation resistance and corrosion resistance, the formed body of monolithic refractories containing graphite utilizing the powder mixture is comparable to the shaped refractories containing graphite.

Furthermore, when two or more kinds of small particles are simultaneously or overlappingly attached to the particle surfaces of the graphite powder, the respective small particles can be provided with different functions other than the hydrophilic property. When the different small particles are attached to the particle surfaces of the graphite powder overlappingly, it is only required that the lastly attached small particles are provided with the hydrophilic property, and the hydrophilic graphite-base powder can be obtained.

The powder mixture for monolithic refractories containing graphite of this invention may be provided with 0.1 to 5 wt % of binders such as phosphate, silicate, borate, lactate, clay, aluminous cement, silica sol and the like, and 0.01 to 1 wt % of dispersion agent such as phosphate, silicate, sulphonate and surface active agents.

When the powder mixture of the graphite-base powder composed of the graphite particles attached with the hydrophilic small particles on their surfaces, refractory compound powders and binders are mixed with dispersion agents and water, the required quantity of water for the operation can be reduced. That is to say, the bulk density of formed body operated with the powder mixture for monolithic refractories containing graphite as casting material, ramming material, stamping material, gunning material or the like is large.

When a formed body of monolithic refractories containing graphite which is obtained by operating the powder mixture of this invention in the operational field is utilized as a lining material for a vessel of molten iron or molten steel, labor work necessary for the operation can be reduced remarkably. Compared with the formed body of conventional monolithic refractories containing graphite, the formed body of invented powder mixture shows excellent oxidation resistance, corrosion resistance, and there are no joints as in shaped refractories which are poor in the corrosion resistance. Accordingly, the cost/performance ratio of the monolithic refractories containing graphite of this invention, is superior to that, of the shaped refractories containing graphite.

DETAILED DESCRIPTION OF THE PREFERRED EMBODIMENTS

Examples

A specific explanation will be given to the powder mixture for monolithic refractories containing graphite of this invention by the Examples as follows. However, this invention is not restricted by these Examples. In the following Examples, as a device for performing the mechanical impact treatment of a mixture of graphite powder and hydrophilic small particle powders in a high-speed gas flow, a mechanical impact treatment device made by Nara Kikai Seisakusho (type NHS 3) is utilized.

Figure 1:
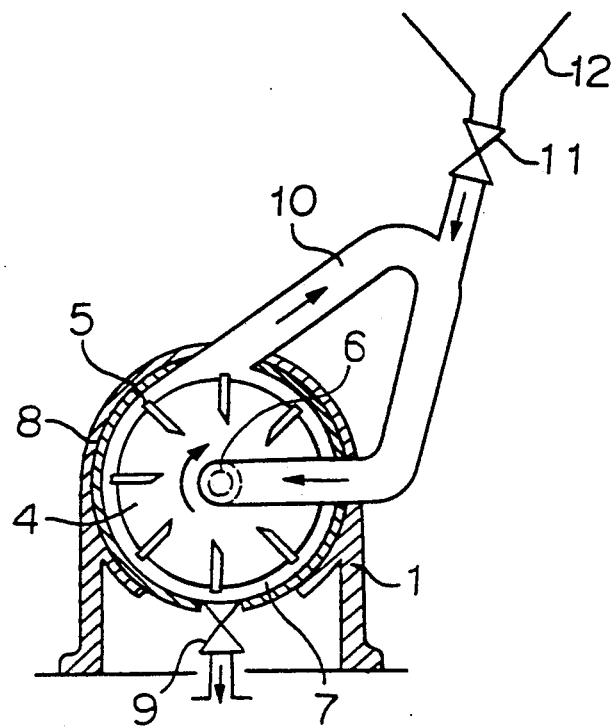
FIG. 1 is a front sectional view of an example of a device performing a mechanical impact treatment to prepare the hydrophilic graphite-base powder utilized in the powder mixture for monolithic refractories containing graphite of this invention.
Figure 2:
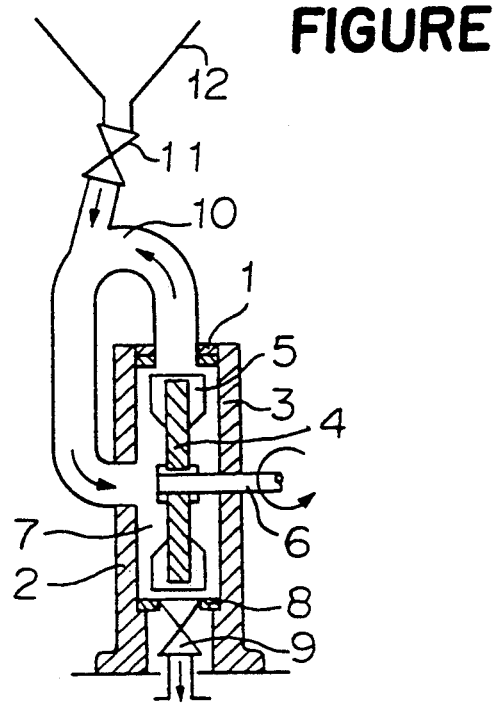
FIG. 2 is a side sectional view of FIG. 1.

The major portion of this device has a construction shown in sectional diagrams of FIGS. 1 and 2, wherein FIG. 1 is a front sectional diagram, and FIG. 2 a side sectional diagram.

In FIGS. 1 and 2, a reference numeral 1 designates a casing, 2, a front wall, 3, a rear wall, 4, a rotating disk, 5, a blade, 6, a rotating shaft, 7, an impact chamber, 8, an impact wall, 9, an outlet valve, 10, a circulating duct, 11, a raw material inlet valve and 12, a hopper.

In this device, a mixture of graphite powder and small particle powders charged from the hopper 12, is introduced in the impact chamber 7 having a ring-like space by opening the raw material inlet valve 11. In the impact chamber 7, there is the rotating disk 4 fixed to the rotating shaft 6 driven by a motor, not shown, and the blades 5 fixed to the rotating disk 4 rotating at a high speed.

The rotating energy of the blades 5 is converted into an energy of a high-speed gas flow in the impact chamber 7. The gas flow carries the powders and repeatedly circulates through the circulating duct 10 which is connected to the impact chamber 7 in the arrow-mark direction.

The graphite particles and the hydrophilic small particles of the mixture collide each other in the gas flow, and are imposed with mechanical forces by the blades 5 rotating at a high speed, by which they are repeatedly applied with mechanical actions such as a impact force, a compressive force, a frictional force, a shear force and the like.

As the result, edges of the graphite particles of the graphite powder are gradually removed. The shape of the particles becomes approximately spherical or ellipsoidal. At the same time, the hydrophilic small particles are attached to the surfaces of the graphite particles to cover their surfaces thereby providing the hydrophilic property to the graphite particles.

At this moment, the rotational speed of the blade 5 is controlled to a speed wherein the particles of the graphite powder are not completely broken. After the mechanical impact treatment has been performed for a predetermined time, obtained graphite-base powder composed of the graphite particles of which surfaces are covered with the hydrophilic small particles is discharged by opening the outlet valve 9.

Test Examples

As graphite powders, a natural flake graphite powder with carbon amount of 98 wt %, particle size of not larger than 150 $\mu$m and mean particle size of about 51 $\mu$m, and an artificial graphite powder with carbon amount of 99 wt %, particle size of not larger than 150 $\mu$m and mean particle size of about 32 $\mu$m, were utilized. As hydrophilic small particles, one or a combination of respective powders of alumina (mean particle size: about 0.6 $\mu$m), silica (mean particle size: 0.2 $\mu$m), silicon carbide (mean particle size: about 5.4 $\mu$m) and aluminum (mean particle size: about 12 $\mu$m), all with good hydrophilic property having absolute values of $\zeta$-potential considerably larger than that of the graphite powders, were utilized. Hydrophilic graphite based powders were obtained by performing the hydrophilic treatment with the graphite powder under combinations and conditions shown in Tables 1, 2 and 3.

The respective combination of the mixtures were charged into the mechanical impact treatment device in a high-speed gas flow and the impact treatment was performed. The temperature of the mixtures during this impact treatment was at most about 150° C. Therefore, the mixture of the graphite particles and the small particles did not suffer any chemical change. The peripheral speed of the rotating disk 4 in the mechanical impact treatment device could be controlled in a range of 10 to 150 m/sec. In case of the particles of the graphite powders of these tests, it was found that the impact treatment was suitably performed at the peripheral speed of not larger than 100 m/sec. so that the breakage of the graphite particles did not occur so much. However, the small particles may be broken to some degree.

In this impact treatment, the attachment of the hydrophilic small particles to the graphite particles was improved when a rather strong impact force was applied wherein the graphite particles were a little broken. In the following tests, the revolution number of the rotating shaft 6 was controlled to the peripheral speed of 60 m/sec. so that the graphite particles were not significantly broken and the attachment of the small particles was effectively performed. About 1 kg per batch of the mixture was charged for the impact treatment.

To obtain the mean particle size of powders, a particle size distribution analyzer by laser diffraction (made by Microtrac Co., model 7997) was used, and the particle sizes at a half of an accumulated volume of the particles, was determined. The time for the impact treatment can be varied in a range of 1 to 20 minutes. However, it was set to 3 minutes as a condition of obtaining a sufficient treatment effect in a short time.

Tables 1, 2 and 3 summarize the results of measured ζ-potentials of the graphite and the treated hydrophilic graphite-base powders, with various combinations of small hydrophilic particles. In these Tables, Tests No. 18, 19, 20 and 23 are Comparative Examples.

Powder mixtures for monolithic refractories containing graphite were made up by combining the hydrophilic graphite-base powders obtained as above, with an electrically-fused magnesia powder and an electrically-fused alumina powders as the refractory compound powders. These powder mixtures were evaluated by the following methods and results were summarized in Tables 4, 5 and 6.

a. ζ-Potential 1 weight part of the impact-treated each graphite-base powder or other graphite-base powder was mixed with 10 weight parts of an aqueous solution of 0.01 mol KCl, to prepare up a slip. After the slip is deaerated under a reduced pressure for 30 minutes, the slip was added with an aqueous solution of 0.01 normal KOH thereby controlling pH to 11. The ζ-potential was measured by the colloid vibration potential method at 25° C.

The larger the absolute value of the ζ-potential, the more excellent the dispersion property with respect to water.

b. Flow of Batch

Magnesia Based Batch (No. 1 to 20)

6 to 22 weight parts of graphite-base powders on which surfaces hydrophilic particles were attached by the impact treatment and graphite powder or other graphite-base powders as Comparative Examples, 86 weight parts of electrically-fused magnesia powders having the maximum particle size of 20 mm and the minimum particle size of 40 μm, 4 weight parts of alumina fine powders (mean particle size: about 0.6 μm), 4 weight parts of silica fine powders (mean particle size: about 0.2 μm), 3 weight parts of metallic silicon powders (particle size: not larger than 149 μm), 1.5 weight parts of lactic acid as a binder, 0.1 weight part of β-naphthalenesulfonic salt as a dispersion agent and 8 to 12 weight parts of distilled water, were charged in a planetary mixer and mixed for 1 minute, thereby obtaining a batch having thixotropy. Alumina based batch (No. 21 to 23).

In the similar way, 6 weight parts of graphite-base powders, 72 weight parts of electrically-fused alumina powders having the maximum particle size of 5 mm and the minimum particle size of 40 μm as refractory compound powders, 7 weight parts of alumina fine powders (mean particle size: about 2.3 μm), 4 weight parts of silica fine powders (mean particle size: about 0.2 μm), 3 weight parts of silicon carbide powders having particle sizes of not larger than 74 μm, 3 weight parts of silicon powders having particle sizes of not larger than 149 μm, 5 weight parts of aluminous cement as a binder, 0.1 weight part of sodium tripolyphosphate as a dispersion agent and 6.3 to 8.3 weight parts of distilled water, were charged in the planetary mixer and mixed for 1 minute, thereby obtaining a batch having thixotropy.

Each batch was filled in a mold having an inner diameter of 100 mm and a height of 50 mm. A vibration with an intensity of 3G was applied to the batch after the mold was drawn out, in the vertical direction for 10 seconds thereby softening and deforming the batch. A maximum spread dimension of the batch was measured as an index of flow. However, a large amount of distilled water was added to each batches having insufficient flow for casting. Therefore, this difference should be considered in the comparison of the flows.

c. Bulk Density

The batches which were the same with those utilized in the measurement of the flow were formed by casting them in a mold having inner dimensions of 50 mm×50 mm ×50 mm by a vibration casting. After setting them for a day at room temperature, the test pieces were removed from the molds and dried for 24 hours at 110° C. Thereafter, weights of the respective test pieces were measured thereby calculating the bulk density.

TABLE 1

| | Weight part | Test No. 1 | 2 | 3 | 4 | 5 | 6 | 7 | 8 |
|---|---|---|---|---|---|---|---|---|---|
| Graphite-base powder | Natural flake graphite powder (51 μm*) | 100 | 100 | 100 | 100 | 100 | 100 | 100 | 100 |
| | Artificial graphite powder (32 μm*) | — | — | — | — | — | — | — | — |
| Small particles | | | | | | | | | |
| | Alumina (0.6 μm*) | 5 | 10 | — | — | — | — | — | — |
| | Silica (0.2 μm*) | — | — | 5 | 10 | — | — | — | — |
| | Silicon carbide (5.4 μm*) | — | — | — | — | 5 | 10 | 20 | 30 |
| | Aluminum (12 μm*) | — | — | — | — | — | — | — | — |
| | Carbon content** | 93 | 89 | 93 | 89 | 93 | 89 | 82 | 75 |
| | ζ-potential (mV) | −4.6 | −3.9 | −3.7 | −4.8 | −4.2 | −6.9 | −7.4 | −8.8 |

*Mean particle size by a particle size analyzer by laser diffraction
**Weight percent

TABLE 2

| | Weight part | Test No. 9 | 10 | 11 | 12 | 13 | 14 | 15 | 16 |
|---|---|---|---|---|---|---|---|---|---|
| Graphite-base powder | Natural flake graphite powder (51 μm*) | — | 100 | 100 | 100 | 100 | 100 | 100 | 100 |
| | Artificial graphite powder | 100 | — | — | — | — | — | — | — |

TABLE 2-continued

|  | Weight part | Test No. 9 | 10 | 11 | 12 | 13 | 14 | 15 | 16 |
|---|---|---|---|---|---|---|---|---|---|
|  | (32 μm*) |  |  |  |  |  |  |  |  |
|  | Small particles |  |  |  |  |  |  |  |  |
|  | Alumina (0.6 μm*) | — | 5 | 5 | 5 | — | — | — | — |
|  | Silica (0.2 μm*) | — | 5 | — | — | — | — | — | — |
|  | Silicon carbide (5.4 μm*) | 5 | — | 5 | 5 | 10 | 10 | 10 | 10 |
|  | Aluminum (12 μm*) | — | — | — | 5 | — | — | — | — |
|  | Carbon content** | 94 | 89 | 89 | 85 | 89 | 89 | 89 | 89 |
|  | ζ-potential (mV) | −7.2 | −4.0 | −4.2 | −4.6 | −6.9 | −6.9 | −6.9 | −6.9 |

*Mean particle size by a particle size analyzer by laser diffraction
**Weight percent

TABLE 3

|  | Weight part | Test No. 17 | 18 | 19 | 20 | 21 | 22 | 23 |
|---|---|---|---|---|---|---|---|---|
| Graphite-base powder | Natural flake graphite powder (51 μm*) | 100 | 100 | 100 | — | 100 | 100 | 100 |
|  | Artificial graphite powder (32 μm*) | — | — | — | 100 | — | — | — |
|  | Small particles |  |  |  |  |  |  |  |
|  | Alumina (0.6 μm*) | — | — | Phenol resin coated | SiC coated by CVD in SiO | — | — | Phenol resin coated |
|  | Silica (0.2 μm*) | — | — |  |  | — | — |  |
|  | Silicon carbide (5.4 μm*) | 10 | — |  |  | 10 | 20 |  |
|  | Aluminum (12 μm*) | — | — |  |  | — | — |  |
|  | Carbon content** | 89 | 98 | 90 | 65 | 89 | 82 | 90 |
|  | ζ-potential (mV) | −6.9 | −0.8 | −3.9 | −12.7 | −6.9 | −7.4 | −3.9 |

*Mean particle size by a particle size analyzer by laser diffraction
**Weight percent

TABLE 4

|  | Weight part | Test No. 1 | 2 | 3 | 4 | 5 | 6 | 7 | 8 |
|---|---|---|---|---|---|---|---|---|---|
| Monolithic refractories containing graphite | Graphite-base powder | 6 | 6 | 6 | 6 | 6 | 6 | 6 | 6 |
|  | Graphite powder | — | — | — | — | — | — | — | — |
|  | Electrically-fused magnesia (40 μm to 20 mm) | 86 | 86 | 86 | 86 | 86 | 86 | 86 | 86 |
|  | Alumina (0.6 μm*) | 4 | 4 | 4 | 4 | 4 | 4 | 4 | 4 |
|  | Silica (0.2 μm*) | 4 | 4 | 4 | 4 | 4 | 4 | 4 | 4 |
|  | Silicon (149 μm ≧) | 3 | 3 | 3 | 3 | 3 | 3 | 3 | 3 |
|  | Lactic acid | 1.5 | 1.5 | 1.5 | 1.5 | 1.5 | 1.5 | 1.5 | 1.5 |
|  | β-naphthalene-sulfonic acid | 0.1 | 0.1 | 0.1 | 0.1 | 0.1 | 0.1 | 0.1 | 0.1 |
|  | Distilled water | 8 | 8 | 8 | 8 | 8 | 8 | 8 | 8 |
|  | Flow index (mm) | 194 | 188 | 182 | 196 | 192 | 216 | 217 | 221 |
|  | Bulk density | 2.53 | 2.51 | 2.52 | 2.53 | 2.49 | 2.54 | 2.55 | 2.56 |
|  | Oxidation resistance (mm) | 3.2 | 2.2 | 3.5 | 2.8 | 2.8 | 1.7 | 1.4 | 1.5 |
|  | Corrosion resistance (mm/hr) | 4.4 | 4.2 | 4.5 | 4.3 | 3.3 | 3.1 | 2.8 | 2.7 |

*Mean particle size by a particle size analyzer by laser diffraction

TABLE 5

|  | Weight part | Test No. 9 | 10 | 11 | 12 | 13 | 14 | 15 | 16 |
|---|---|---|---|---|---|---|---|---|---|
| Monolithic refractories containing grahite | Graphite-base powder | 6 | 6 | 6 | 6 | 3 | 5.5 | 9 | 12 |
|  | Graphite powder | — | — | — | — | — | — | — | — |
|  | Electrically-fused magnesia (40 μm to 20 mm) | 86 | 86 | 86 | 86 | 86 | 86 | 86 | 86 |
|  | Alumina (0.6 μm*) | 4 | 4 | 4 | 4 | 4 | 4 | 4 | 4 |
|  | Silica (0.2 μm*) | 4 | 4 | 4 | 4 | 4 | 4 | 4 | 4 |
|  | Silicon (149 μm ≧) | 3 | 3 | 3 | 3 | 3 | 3 | 3 | 3 |
|  | Lactic acid | 1.5 | 1.5 | 1.5 | 1.5 | 1.5 | 1.5 | 1.5 | 1.5 |
|  | β-naphthalene-sulfonic acid | 0.1 | 0.1 | 0.1 | 0.1 | 0.1 | 0.1 | 0.1 | 0.1 |
|  | Distilled water | 8 | 8 | 8 | 8 | 8 | 8 | 9 | 10 |
|  | Flow index (mm) | 190 | 189 | 193 | 196 | 240 | 212 | 184 | 215 |

TABLE 5-continued

| Weight part | Test No. | | | | | | | |
|---|---|---|---|---|---|---|---|---|
| | 9 | 10 | 11 | 12 | 13 | 14 | 15 | 16 |
| Bulk density | 2.51 | 250 | 2.52 | 2.52 | 2.58 | 2.54 | 2.45 | 2.37 |
| Oxidation resistance (mm) | 2.0 | 2.1 | 1.6 | 1.4 | 2.6 | 1.8 | 1.9 | 1.6 |
| Corrosion resistance (mm/hr) | 4.0 | 4.2 | 3.2 | 2.9 | 2.1 | 2.8 | 2.5 | 3.2 |

*Mean particle size by a particle size analyzer by laser diffraction

TABLE 6

| | Weight part | Test No. | | | | | | |
|---|---|---|---|---|---|---|---|---|
| | | 17 | 18 | 19 | 20 | 21 | 22 | 23 |
| Monolithic refractories containing graphite | Graphite-base powder | 22 | — | 6 | 6 | 6 | 6 | 6 |
| | Graphite powder | — | 6 | — | — | — | — | — |
| | Electrically-fused magnesia (40 μm to 20 mm) | 86 | 86 | 86 | 86 | — | — | — |
| | Electrically-fused alumina (40 μm to 5 mm) | — | — | — | — | 72 | 72 | 72 |
| | Alumina (0.6 μm*) | 4 | 4 | 4 | 4 | — | — | — |
| | Alumina (2.3 μm*) | — | — | — | — | 7 | 7 | 7 |
| | Silica (0.2 μm*) | 4 | 4 | 4 | 4 | 4 | 4 | 4 |
| | Silicon carbide (74 μm ≧) | — | — | — | — | 3 | 3 | 3 |
| | Silicon (149 μm ≧) | 3 | 3 | 3 | 3 | 3 | 3 | 3 |
| | Lactic acid | 1.5 | 1.5 | 1.5 | 1.5 | — | — | — |
| | Aluminous cement | — | — | — | — | 5 | 5 | 5 |
| | β-naphthalene-sulfonic acid | 0.1 | 0.1 | 0.1 | 0.1 | — | — | — |
| | Sodium tripolyphosphate | — | — | — | — | 0.1 | 0.1 | 0.1 |
| | Distilled water | 12 | 11 | 8 | 8 | 6.5 | 6.3 | 8.3 |
| | Flow index (mm) | 196 | 170 | 176 | 190 | 216 | 218 | 173 |
| | Bulk density | 2.29 | 2.46 | 2.48 | 2.41 | 2.87 | 2.89 | 2.82 |
| | Oxidation resistance (mm) | 1.6 | >20 | 5.1 | 9.8 | 2.5 | 2.3 | 7.2 |
| | Corrosion resistance (mm/hr) | 4.4 | 15.7 | 7.5 | 11.0 | 2.8 | 2.2 | 3.6 |

*Mean particle size by a particle size analyzer by laser diffraction d. Oxidation Resistance

Magnesia Based Refractories, No. 1 to 20, 24

The respective test pieces of 50 mm×50 mm×50 mm for checking the bulk density were heated and retained in air at 1500° C. for 2 hours. After cooling, the test pieces were cut into two at the center and depths of decarburized layers in the sections were measured as indices of the oxidation resistance. As a Comparative Example, a similar test was performed as for a nonfired shaped brick of magnesia-graphite-base (test No. 24) containing 15 wt % of natural flake graphite and having the bulk density of 2.9. The depth of the decarburized layer was 4.6 mm.

Alumina Based Refractories, No. 21 to 23, 25

In the similar way, the respective test pieces for checking the bulk density were heated and retained in air at 1450° C. for 5 hours. After cooling, the test pieces were cut into two at the center and the depths of the decarburized layers in the sections were measured as indices of the oxidation resistance. As a Comparative Example, a similar test was performed as for a nonfired shaped brick of alumina-graphite-base (test No. 25) containing 10 wt % of natural flake graphite and 5 wt % of silicon carbide having the bulk density of 2.9. The depth of the decarburized layer was 6.7 mm.

e. Corrosion Resistance

Magnesia Based Refractories, No. 1 to 20, 24

Test pieces of monolithic refractories, containing graphite of which sections are trapezoids of 50 mm×160 mm×45 to 95 mm, were formed by casting. Six of these test pieces were combined including a non-fired shaped brick of magnesia-graphite-base (test No. 24) cut in the same dimension as a Comparative Example, forming a column having a hexagonal hole (inner diameter; about 7.8 cm) at the center. The trapezoidal column was held sidelong. The test pieces combined in the column were fixed to a rotary type corrosion test furnace. The temperature of the column was held at a predetermined value while rotating the column at 20 rpm.

A corrosion agent having 1:1 weight ratio of slag and carbon steel pieces was charged to the central hole of the test pieces at first by 0.6 kg. While maintaining the furnace temperature at 1650° C., an additional corrosive agent of 300 g was added and at the same time the corrosive agent of the same quantity was discharged at every 30 minutes thereby performing the rotary type corrosion test for 5 hours. After cooling, the respective test pieces taken out of the furnace were cut into two at their center in the longitudinal direction. And a rate of corrosion of each test piece was obtained by a depth of the most deeply corroded portion, as an index of the corrosion resistance.

The rate of corrosion of a nonfired shaped brick of magnesia-graphite-base (test No. 24) in this test was 5.8 mm per hour. The chemical component of the slag used in this test was CaO 40%, CaF$_2$ 20%, SiO$_2$ 10% and Al$_2$O$_3$ 30% in weight %.

Alumina Based Refractories, No. 21 to 23, 25

As for the monolithic refractories of alumina-graphite-base, test pieces of 40 mm×120 mm×50 to 83 mm having a trapezoidal section were made up by casting. As a Comparative Example, a test piece of a nonfired shaped refractory of alumina-graphite-base (test No. 25) was formed. Eight pieces of these test pieces were combined thereby forming an octagonal hole (inner diameter of about 8.7 cm) at their central portion which were fixed by mortar at a level of a molten metal surface in a crucible of an induction furnace. In this crucible, a corrosion agent of 1:1 ratio of pig iron and slag was charged by about 50 kg in total, which was molten and retained by an induction heating at 1500° C. for 5 hours. After cooling, each test piece was taken out and cut into two in the longitudinal direction. The rate of corrosion was investigated based on a maximum corrosion depth.

The rate of corrosion in the nonfired shaped refractory of alumina-graphite-base (test No. 25) in this test was 3.4 mm per hour. The chemical component of the slag utilized in this test was CaO 50%, CaF$_2$ 25%, SiO$_2$ 10%, and FeO 15% in weight %.

It was clarified from these test results that the absolute value of $\zeta$-potential and the dispersion property with respect to water of the graphite-base powders attached with the hydrophilic small particles on the particle surfaces thereof were excellent compared with those of the graphite-base powders without the surface-treatment or surface-treated by any conventional technology. Equally excellent dispersion properties were obtained both in case that a kind of hydrophilic small particles was attached to the surfaces of the graphite particles and also in the case that two kinds or more of the hydrophilic small particles were attached to the surfaces of the graphite particles.

As is apparent from the test result of No. 20, as for the graphite-base powder CVD-coated with SiC in SiO gas, the absolute value of $\zeta$-potential is large and the dispersion property is excellent. However, since the porosity thereof is also large, when they are utilized as a monolithic refractories, the functions thereof including the corrosion resistance are poor. This is because that the bulk density is reduced since the surfaces of the graphite particles have a porous rugged structure.

In the monolithic refractories composed of the powder mixture for monolithic refractories of this invention which is obtained by using the hydrophilic graphite-base powders, when they are mixed with water as a dispersion media, the flow of the batch is excellent even with a reduced quantity of added water, the bulk density of a molded body of the monolithic refractory obtained by forming the batch is large and the formed body is excellent in the corrosion resistance and the oxidation resistance.

Furthermore, comparing shaped refractories containing graphite having a remarkable performance which are currently utilized in the field of iron making and steel making, with the monolithic refractories containing graphite by this invention, there is not so much difference between both in the corrosion resistance and the oxidation resistance. However, the monolithic refractory has an advantage wherein it can be utilized without joints which are poor in the corrosion resistance. Accordingly, the monolithic refractory containing graphite is provided with an excellent cost/performance ratio accounting the effect of significantly saving the labor work and energy which are at least necessary in the production process and the operation.

The graphite-base powder utilized in the powder mixture for monolithic refractories containing graphite o of this invention, has a large absolute value of $\zeta$-potential in water, and shows an excellent dispersion property when water which is easy to use as a dispersion media, is utilized as the dispersion media, compared with the graphite powder without any surface treatment, or the graphite-base powders which are surface-treated by conventional methods.

Accordingly, the invention can provide monolithic refractories containing graphite without using any organic solvent having an adverse effect in the working environment, providing an excellent dispersion property with respect to water, obtaining a formed body of a large bulk density. The obtained formed bodies are excellent in the corrosion resistance, and excellent in the oxidation resistance.

By selecting the material of the hydrophilic small particles to be attached to the particle surfaces of the graphite powder, or by attaching two kinds or more of the hydrophilic small particles thereto, the graphite-base powder can be provided with preferable properties other than the hydrophilic property, by which the invention can provides the monolithic refractories containing graphite excellent also in the oxidation resistance or the like.

By performing the mechanical impact treatment to a mixture of the graphite powder and the small particle powders having the hydrophilic property, the graphite-base powder excellent in the dispersion property with respect water can simply and efficiently be obtained. Even when the particle shape of the graphite powder is flake-like or needle-like having a large aspect ratio, since the treatment of making the particle shape spherical or ellipsoidal and therefore, reducing the aspect ratio, and the treatment of attaching the hydrophilic small particles to the particle surfaces of the graphite powder are simultaneously performed, a graphite-base powder having excellent packing efficiency can be provided, and when it is used as a monolithic refractories, a formed body of a large bulk density can be provided.

By using water as a dispersion media, a formed body of a monolithic refractories containing graphite having a large bulk density has not been obtained in the conventional technology, and therefore, which has not been much utilized in the field of iron making and steel making since it is insufficient in the oxidation resistance and the corrosion resistance. Now, a formed body of the monolithic refractories having a large bulk density is obtainable, by using the powder mixture for monolithic refractories containing graphite of this invention, by using water as a dispersion media, and the oxidation resistance and the corrosion resistance thereof are considerably improved. Accordingly, the effect of labor and energy saving which is an inherent characteristic of the monolithic refractories, can be utilized in the monolithic refractories containing graphite, and the industrial value of utilization is great.

What is claimed is:

1. A powder mixture for monolithic refractories composed of:
   (i) refractory compound powders, and (ii) a graphite-based powder comprising:
  (a) graphite particles, and
  (b) small particles having hydrophilic properties selected from the group consisting of metal oxides, metal carbides, metal nitrides, metal borides, and metals; wherein said small particles have a mean particle size smaller than that of said graphite particles and each small particle is tightly attached to the surface of said graphite particles;

wherein said powder mixture contains 2 to 40 weight percent of carbon based on the total weight of said graphite-based powder and said refractory compound powders.

2. The powder mixture of claim 1, which contains 4 to 25 weight percent of carbon based on the total weight of said graphite-based powder and said refractory compound powders.

3. The powder mixture according to claim 1 wherein the mean particle size of said small particles is not larger than 40 percent of the mean particle size of the graphite particles.

4. The powder mixture according to claim 1, wherein said small particles are selected from the group consisting of alumina, silica, silicon carbide, silicon, and aluminum.

5. The powder mixture according to claim 1, wherein said refractory compound powders are selected from the group consisting of magnesia and alumina.

6. A method of making a powder mixture for monolithic refractories containing graphite comprising the steps of:
  (i) producing a graphite-based powder by performing a mechanical impact treatment in a high-speed gas flow, on a mixture comprising:
    (a) 70 to 97 weight percent of a powder composed of graphite particles, and
    (b) 3 to 30 weight percent of a powder composed of small particles having hydrophilic properties of one or more members selected from the group consisting of metal oxides, metal carbides, metal nitrides, metal borides, and metals; wherein said small particles have a mean particle size which is not larger than 40 percent of the mean particle size of the graphite particles and each small particle is tightly attached to the surface of said graphite particles; and
  (ii) mixing the graphite-based powder with refractory compound powders, so that said powder mixture contains 2 to 40 weight percent of carbon based on the total weight of said graphite particles and said small particles.

* * * * *